Feb. 8, 1955 E. J. BULLARD Re. 23,937

LAPPING MACHINE

Original Filed Nov. 28, 1945 3 Sheets-Sheet 1

Inventor,
EARL J. BULLARD
By Galvin Brown
Attorney

LAPPING MACHINE

Original Filed Nov. 28, 1945 3 Sheets-Sheet 2

Inventor,
EARL J. BULLARD
By Calvin Brown,
Attorney

LAPPING MACHINE

Original Filed Nov. 28, 1945 3 Sheets-Sheet 3

Inventor,
EARL J. BULLARD
By
Attorney

United States Patent Office

Re. 23,937
Reissued Feb. 8, 1955

23,937

LAPPING MACHINE

Earl J. Bullard, Altadena, Calif.; Beth Bernice Green, executrix of said Earl J. Bullard, deceased Original No. 2,565,590, dated August 28, 1951, Serial No. 14,619, March 12, 1948. Application for reissue June 25, 1953, Serial No. 364,224

14 Claims. (Cl. 51—131)

Figure 1:
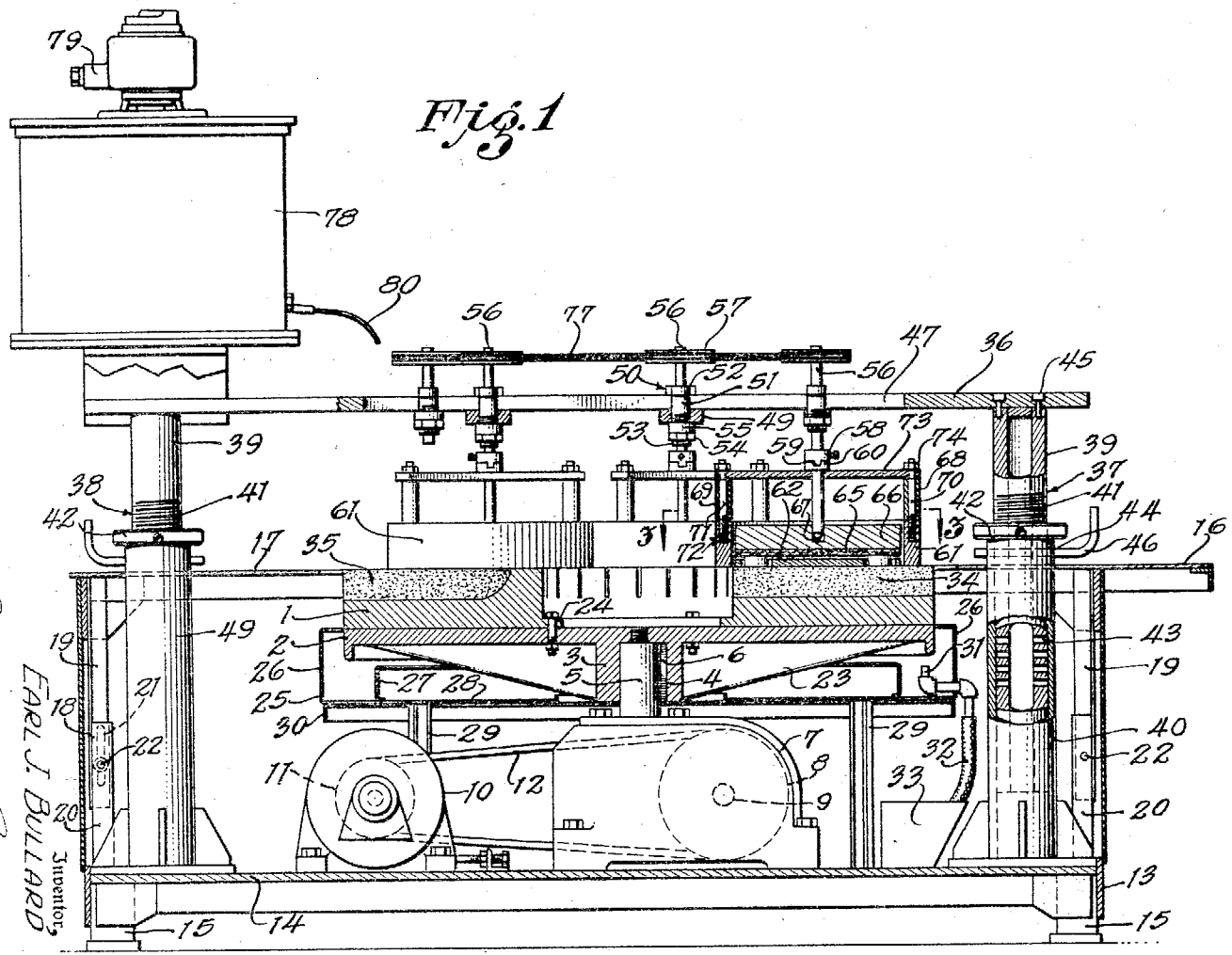

Matter enclosed in heavy brackets [ ] appears in the original patent but forms no part of this reissue specification; matter printed in italics indicates the additions made by reissue.

This invention relates to lapping machines, and *my original application for a patent on this invention* constitutes a *continuation-in-part* [continuation] of my application for [Grinding and] Lapping Machine, filed November 28, 1945, Serial No. 631,254, which issued as Patent No. 2,480,285, dated August 30, 1949.

In my *patent* [application] heretofore mentioned, I have provided a grinding and lapping machine wherein the work is so positioned on the lap and moved relative to the lap surface during a lapping operation that the lap surface is maintained true. In said *patent* [application], it was pointed out that dressing of the lap was a tedious operation and if the lap surface is not maintained in a good working condition, the articles lapped will be unsatisfactory and possibly rejected. In the structure referred to, the work is reciprocated across the lap surface, whereas in the present invention, the work is not reciprocated relative to the lap surface.

An object of the present invention is the provision in a lapping machine having a lap surface, of an arrangement of the work, work holder, and wear rings whereby the lap is constantly and automatically dressed during a lapping operation.

A further object is the provision in a lapping machine of a novel arrangement of wear rings which permits the working surface of the lap to be dressed in accordance with requirement for said surface. By way of example, the present invention permits the lap to be dressed whereby the lap surface may assume and maintain a required convex, concave, or plane surface.

A further object is the provision in a lapping machine for dressing a lap surface while it is lapping work so that the integrity of the lap surface is maintained, whereby dressing of the lap by its physical removal from the lapping machine is, to a large extent, obviated. It is a notoriously known fact that laps are heavy and difficult to manage and dress. Furthermore, if the lap surface deviates from "true," the work to be lapped will be damaged and rendered useless. As a consequence, if the lap surface does not maintain its trueness for the particular work intended, the lap must be removed from its table and then dressed under certain conditions of temperature, which is a long tedious job and requires an expert workman. With the present invention, the character of the lap surface may be determined by the operator while the lap surface is in the act of lapping work.

Other objects of the invention will appear as the specification proceeds, among which objects are the provision of a lapping machine which is inexpensive in cost of manufacture, and capable of producing superior results in actual use and service.

With the above mentioned and other objects in view, the invention consists in the novel and useful provision, formation, construction, association, and relative arrangement of parts, members, and features, all as detailed in a certain embodiment in the accompanying drawings, described generally, and more particularly pointed out in the claims.

Figure 2:
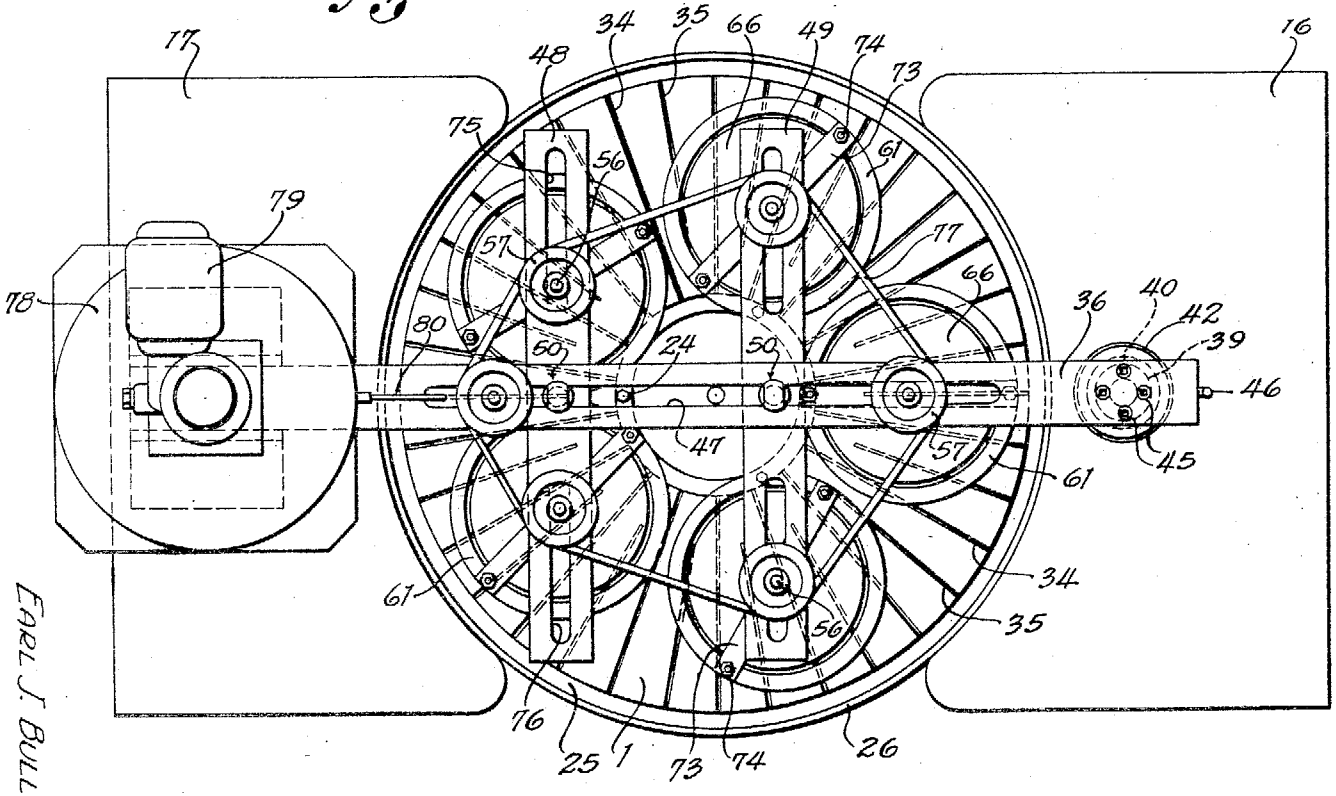
Figure 3:
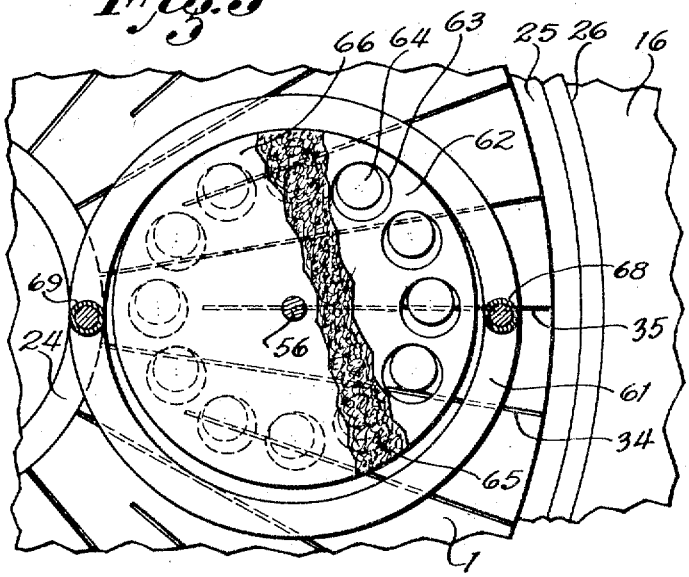
Figure 4:
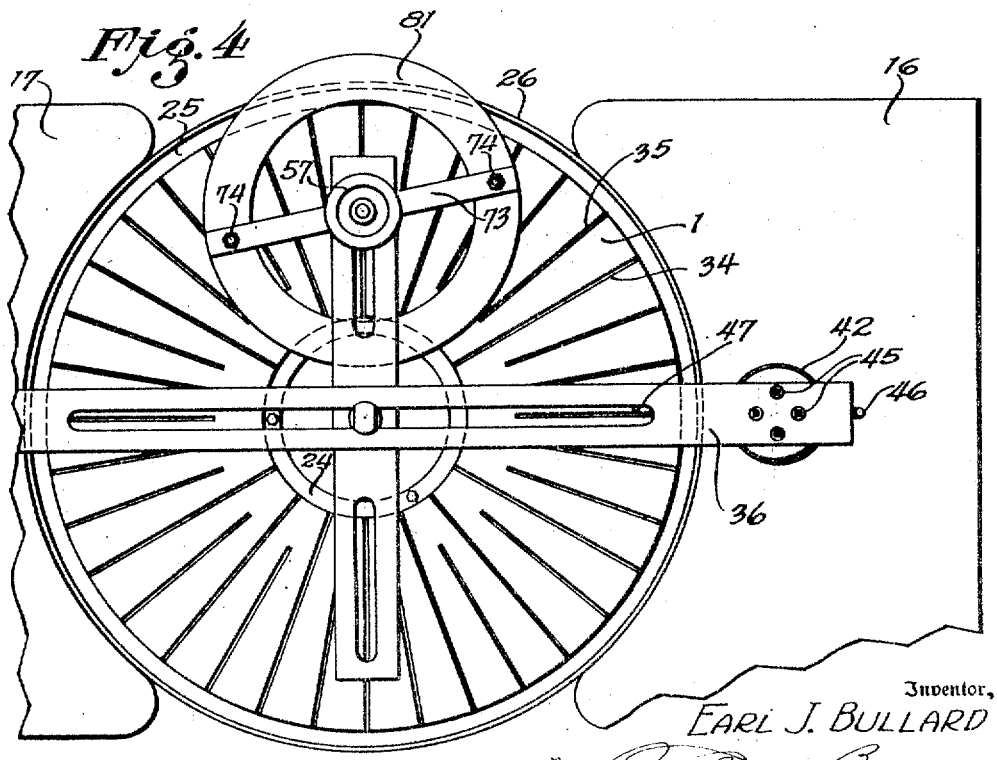

In the drawings:

Figure 1 is a side elevation, partly in section, of the lapping machine considered as an entirety, Figure 2 is a top plan view of the lapping machine shown in Figure 1, Figure 3 is a sectional view on the line 3—3 of Figure 1, on an enlarged scale, and, Figure 4 is a fragmentary plan view of the lapping machine and showing a truing ring on the lap surface.

Referring now with particularity to the drawings, I have provided at 1 a lap which, in the present instance, is annular in form. This lap is carried upon a table 2, which table is provided with a central boss 3 having a keyway 4. The boss is adapted to receive a shaft 5 provided with a keyway opposing keyway 4, between which keyways is the usual key 6. Shaft 5 projects from a casing 7, within which is a speed reducer, not detailed as to construction. For the purpose of illustration, the speed reducer is provided with a sheave at 8, mounted upon a shaft 9; 10 is a motor, the shaft of which carries a sheave 11, and a continuous belt 12 is passed between the sheaves 8 and 11. Thus, in the embodiment shown, the motor will drive shaft 9 at one speed, while various gearing or other means within the speed reducer finally drives the shaft 5 at a speed which is usually about 50 revolutions per minute. It is, of course, appreciated that a variable speed reducer may be incorporated, but this phase of the construction of the present lap forms no part of the invention.

Another speed reducer and other parts, to be set forth, may be suitably carried by framing, designated generally as 13, the framing having a base member 14 mounted upon legs designated generally as 15, the said framing carrying tops 16 and 17; said tops have their inner edges corresponding in curvature to the curvature of the lap, as best shown in Figure 2. This structure is followed in order that work on the lap may be readily moved from the lap surface onto one of the tops upon completion of a lapping operation. To this end, the surfaces of said tops are maintained in the same plane as the working surface of the lap, as for instance shown in Figure 1. To accomplish this, the tops are made adjustable as to height so as to lie in the same plane as the lap working surface, this being necessitated by wear of the lap surfaces. A simple adjustment may be used, such as, for instance, shown in Figure 1, at 18, and which comprises a pair of supports 19 and 20, one of the supports being formed with an elongated slot 21, and the other support carrying a locking screw 22 which is movable within the slot. Any number of such adjustable supports may be utilized to the end that the tops are maintained in a stable condition while sustaining load.

It will be observed that the table 2 is reinforced on its bottom surface with radial webs 23 which extend between the hub and a rim flange and are integral with the bottom surface thereof. The lap is provided with an annular flange 24, and bolts are passed through the flange and table for securing the aforesaid members together. Surrounding the table and spaced slightly therefrom is what may be designated as a trough 25. The trough includes outer and inner spaced annular walls 26 and 27 of different heights and carried on an annular base 28. The base 28 is held by supports 29 secured to base 14. This base may be reinforced by a ring flange 30. If desired, the supports 29 may be of the same type as the supports for the tops 16 and 17, whereby the trough as an entirety may be adjusted as to height relative to the table 2.

As is usually understood in this art, the lap receives on the surface thereof an oil grit, which is used for assisting in grinding or lapping the work positioned on the lap surface. As this grit is usually fed continuously onto the lap surface, it is essential that it be removed during a lapping operation, and its removal is effected by being directed into the trough 25 to allow a settling of the grit on the base of the trough. The construction is such that after the grit and oil have built to a certain height within the trough, the oil thereof is removed, and this is accomplished by providing a tube 31 which is adjustably received within the trough to position the mouth end thereof at different heights, and which tube connects with a flexible tube 32 leading to a container 33. Thus, the oil overflows into the tubes 31 and 32 and into the container, and after the grit has built to a given height within the trough, the trough, as an entirety, may be removed and cleaned. The oil, however, has been saved. As shown in the drawings, the lap is provided with radial grooves 34 and 35. The grooves 35 do not extend completely transversely of the lap surface and the arrangement is such, as depicted in Figure 2, that the oil and grit received within the grooves is directed into the trough 25. This lap structure is described in my *patent* [co-pending application] for [Grinding and] Lapping Machine, *No. 2,480,285*. [Supra, of which this application is a continuation.]

Positioned diametrically of the lap 1 is a bar 36. The said bar is supported by posts 37 and 38. The posts are identically constructed, and reference is made to the post 37, wherein it will be seen that the post is in two parts and maintained in telescopic relationship. One part 39 is adapted to be received in tubular part 40. Part 39 is externally provided with screw-threads 41. Carried at one end of part 40 is a nut 42 which has engagement with the screw-threads 41. Part 39 is provided with a series of spaced, diametrically positioned bores 43 and the part 40 is provided with a diametric bore 44 which is located adjacent the upper end of said part. The portion 40 of the post is mounted on the base 14 and extends through an opening in the tops 16 or 17. In the present instance, the part 39 is secured to the bar by means of screws 45. Adjustment is afforded by first removing rod 46 which is passed through the bores 43 and 44, whereupon the nut 42 may be rotated to raise or lower the part 39 relative to part 40. The rod 46 is then passed through aligned openings 43 and 44 and nut 42 tightened so that the bar 36 will not lower or raise consequent upon any vibration of the machine when in operation. The bar 36 is provided with a longitudinal slot 47 (see Figure 4). The arrangement is such that suitable means is passed through the longitudinal slot 47, which means cooperates with the bar 36 and secures transverse arms, of which there may be a number, 48 and 49, which arms are adjustable through said means relative to the diametric bar 36. The means for securing the transverse arms relative to the bar 36 are designated as entireties by 50, reference being had to Figure 1. Said means includes a sleeve 51 provided with a head 52 of annular form, which head is adapted to overlie the bar 36 on both sides bounding the slot 47, the sleeve portion 51 being passed through said slot and through a transverse arm, a portion of said sleeve being externally screw-threaded at 53 to receive a nut 54. Interposed between the nut 54 and the under surface of one of the transverse arms is a washer 55. Thus, by tightening nut 54, a transverse arm is secured against movement relative to bar 36. Passed through the sleeve 51 is a pin 56, the upper end of which carries a sheave 57. Adjustably positioned on the pin 56 and beneath the nut 54 is a member 58 in the form of an annulus, the lower surface of which is provided with a pair of diametric tongues 59 adapted to be received within a diametric groove of member 60, the said pin 56 passing through the aforesaid members 58 and 60. For convenience, the two members 58 and 60 are termed interlocking collars.

As shown in Figure 2, work is adapted to be positioned on the lap surface for the purpose of grinding the work. In the present instance, to accomplish this lapping, I have provided one or more wear rings 61, which may be formed of the same material as the lap, that is to say, cast iron, and said rings are adapted to confine the work. Thus, upon reference to Figures 1 and 3, I may provide what is known as a work holder 62 which is formed with an annular series of spaced openings or bores 63 within which is positioned work 64. The work holder 62 is loosely fitted within the confines of a wear ring 61. *As the lap 1 revolves, any object resting thereon is urged by centrifugal action to move away from the axis of rotation, so, since the ring cannot so move, altho it may rotate freely, the work holder or any other circular object within the ring and resting freely on the lap will be urged into rolling contact with the revolving ring and by such frictional contact and by the frictional contact with the lap itself will be caused to revolve.* Adapted to overlie the work is a pad 65 formed of felt or other soft material, and resting on the top surface of the felt is a pressure plate 66. Thus, while the work is being lapped, any unevenness is communicated to the pad 65, which will move under the weight of the pressure plate so that the work is not damaged, the pressure plate maintaining a substantially even pressure against all of the work positioned beneath the pad 65. For the purpose of centering the pressure plate, the pressure plate is provided with an axial bore 67 adapted to receive the lowermost end of the pin 56, the pin being pointed at this portion, as shown in Figure 1. The wear ring is provided with a pair of diametrically positioned sleeves 68 and 69 held in position by pins 70 and 71, which are screw-threaded to the wear ring, as illustrated at 72, there being a bar 73 diametrically positioned above the wear ring and resting upon the upper ends of the sleeves 68 and 69, the bar 73 being provided with bores through which the pins 70 and 71 are passed, the assembly being secured by nuts 74. The interlocking collar member 60 is secured to the bar 73 and in such a manner that rotation of a pin 56 will produce retardation of rotation of the wear ring 61. It will be observed that the wear rings in each instance have a diameter approximately equal to the width of the annular lap, that is to say, the width of said lap between the center bore thereof and the rim.

In the embodiment of the invention shown, I have provided a series of wear rings 61, distributed over the lap surface and identically positioned with respect to said lap surface, which is to say that the wear rings, as shown in Figure 2, are inwardly positioned with respect to the rim of the lap and equally inwardly positioned with respect to the center opening of said lap. Furthermore, it is to be observed that the pins 56 are secured at a certain position on the cross arms 48 and 49. To this end, the cross arms 48 and 49 are both provided with longitudinal slots, as shown at 75 and 76. As a sheave 57 is provided for each pin 56, rotation of the sheaves is obtained through a continuous belt 77 passed around the said sheaves, as illustrated in Figure 2. This arrangement will be described in the statement of the operation.

By way of illustration, I provide at 78 a tank adapted to hold the oil and grit, which is supported upon the post 38, there being a motor at 79, which drives an agitator within the container 78, the oil-grit being fed from said container by a wire 80, whereby the oil-grit drops from the end of said wire and onto the working surface of the lap in regulated amounts. No details of this arrangement are given, as it is fully described in *my Patent No. 2,480,285*. [the application of which this application is a continuation.]

The operation, uses, and advantages of the invention just described are as follows:

I assume that the work is within the work holders and within the wear rings, in the manner illustrated in Figure 2, with the lap rotating, and oil-grit is being fed to the working surface thereof. Rotation of the lap will induce rotation in the wear rings, work holder and work. Speed of rotation of the wear rings relative to lap rotation is controlled by the size of the sheaves secured to certain of the pins 56. Thus, if the sheaves are of the same diameter and interconnected by the continuous belt, the wear rings will rotate at substantially the same speed of rotation as that of the lap. If certain of the sheaves are reduced in diameter, or if one of the sheaves is enlarged as to diameter, all of the sheaves having the continuous belt passed therearound, the wear rings will be retarded as to rotation with respect to the speed of rotation of the lap. As the rotation of the wear ring directly affects rotation of the work holder, the work holder being in contact with the wear ring, the work itself will be under controlled rotation. In other words, during rotation of the lap, the work will slide upon the lap surface while it rotates. To maintain the lap surface true, I position the wear rings to wear the lap surface. Thus, when the wear rings are located as indicated in Figure 2, the wear rings extend beyond the inner portion of the lap, that is, the central bore portion. This induces a greater weight on this portion due to the overlap of the wear ring and, as a consequence, the lap surface will be ground to a concave form. If, to the contrary, the wear ring is moved toward the rim of the lap, with the ring extending beyond the rim of the lap, then the lap, after a period of use, will have a convex surface. If the wear rings are positioned intermediate the central bore of the lap and the rim, it being noted that the diameter of the wear ring is equal to the width of the lap, then the lap, when rotated, will wear a plane surface, or maintain such surface. Thus, by regulating the position of the wear rings relative to the inner and outer edges of the annular lap, it is possible to true a lap during the time that work is being lapped. Thus, the arrangement of the work and the wear rings on the lap surface at all times dresses the lap and maintains the lap in workable condition.

In Figure 4, I have illustrated a method and means whereby a lap surface may be dressed, and I accomplish this by providing a truing ring 81 which may be supported by one of the cross arms carried by the bar 36, and which truing ring has considerable weight, by way of example, 250 pounds, the truing ring overlapping the forty-one inch diameter lap surface as illustrated. This truing ring will recondition or dress the lap surface without the necessity of removing the lap from the table, thus saving expense and time of workmen in this regard.

I have found, in actual practice, that the wear ring should be of such weight and area as to wear the lap surface more rapidly than does the work being lapped. Thus, by determination of the weight of the work and of the pressure plate, the weight of the wear ring may be increased above the combined weights of the work and pressure plate, with the result that the lap surface is maintained in a desired condition. In other words, the wear ring should have sufficient weight to wear the lap faster than does the work. Furthermore, if the work holders and the lap rotate at the same speed, the lap surface would wear unevenly because of the difference in the radius of rotation between the two. As the wear ring never rotates any faster than the rotative rate of the lap, the speed of rotation of the wear ring is controlled by varying the sheave size. I have found by actual experiment that when the lap rotates at 50 revolutions per minute, the wear ring will rotate at approximately the same speed, depending upon the lap surface, if the sheaves 57 are of the same diameter and controlled as to rotation by the continuous belt 77. The ideal lap surface is dependent upon proper proportions of work, grit and trueness of lapped surface. If, taking the relationship shown in Figure 2, four of the sheaves 57 have the same diameter, and the fifth is changed to half diameter, the speed of rotation of the wear rings is decreased relative to lap rotation to approximately 40 revolutions per minute, again depending on lap surface condition. If two of the sheaves have half the diameter of the remaining sheaves, the wear rings revolve at substantially 30 revolutions per minute. Thus, by a selection of relative sheave diameter, it is possible to get any desired rotation of the wear rings relative to the lap, and such control of revolution of the wear rings directly affects the rate of revolution of the work and work holder for said work.

In the present invention, I am able to control the character of the lap surface, whether it be concave, convex, or plane, while the lap is dressing work, and thus maintain the condition of the lap without the necessity of shut-downs.

Where the article to be lapped has its opposite sides parallel, the weight 66 is first lapped so as to have a surface contour identical with the working surface of the lap. This weight then imposes a pressure on the articles to produce the desired surface thereon. In a similar manner, I may lap wrist pins.

I claim:

1. Apparatus for forming a true surface of predetermined contour upon an article, said apparatus comprising a lap having a surface capable of producing the desired true surface, means for holding the article on the lap, means for rotating the lap and establishing relative movement between the article and lap, and means for maintaining the surface of the lap in condition to produce the desired true surface while the article is being lapped, said last named means comprising a ring encircling the article holding means contacting the same and also contacting the surface of the lap with a total pressure at least equal to the total pressure between the article and lap surface, said ring being adapted to wear the said surface upon the establishment of relative movement between the ring and lap, and a pivoted support for the ring whereby said ring is free to rotate relative to the lap surface under the influence of frictional forces developed between the ring and lap surface and whereby said rotation is transmitted to the work holder by frictional contact by the ring and holder encircled thereby.

2. Apparatus for forming a true surface of predetermined contour upon an article, said apparatus comprising a lap having a surface capable of producing the desired true surface, means for holding the article on the lap, means for rotating the lap relative to the article, and means for maintaining the surface of the lap in condition to produce the desired true surface, said last named means comprising a ring contacting the surface of the lap and adapted to wear the said surface, said ring loosely encircling the article-holding means, and a pivoted support for the ring whereby the ring is free to rotate relative to the lap surface under the influence of frictional forces developed between the ring and lap surface, and whereby said rotation is transmitted to the work holder by frictional contact between the ring and the holder encircled thereby.

3. Apparatus for forming true surfaces of predetermined contour upon a plurality of articles, said apparatus comprising a lap having a surface capable of producing the desired true surface, means for holding the article in spaced relation on the lap, means for rotating the lap and establishing relative movement between the article and lap, a unitary weight for exerting a pressure upon all of the articles, means interposed between the weight and articles for equalizing the pressure upon the articles, and means for maintaining the surface of the lap in condition to produce the desired true surface while the article is being lapped, said last named means comprising a ring encircling the article holding means, contacting the same and also contacting the surface of the lap and adapted to wear the said surface, and a support for the ring whereby said ring is free to rotate relative to the lap surface under the influence of frictional forces developed between the ring and lap surface and whereby said rotation is transmitted to the work holder by frictional contact by the ring and holder encircled thereby.

4. Apparatus for forming a true surface of predetermined contour upon an article, said apparatus comprising a lap having a surface capable of producing by abrasion the desired true surface, rotatable means for holding the article on the surface of the lap, a wear ring rotatably mounted with respect to and frictionally bearing against the surface, said ring serving to maintain the surface in condition to produce the desired true surface on the article, means for rotating the lap, said rotation of the lap inducing a rotation in the wear ring, and means for transmitting the rotation of the wear ring to the article-holding means.

5. Apparatus for forming a true surface of predetermined contour upon articles, said apparatus comprising a lap having a surface capable of producing by abrasion the desired true surface, a plurality of means for holding the article on the surface, rings encircling the holding means and adapted to drive said holding means, said rings being eccentrically and rotatably mounted with respect to the surface and bearing thereagainst, means for rotating the lap thereby inducing rotation in each ring, and means for transmitting the rotation of a ring to another ring to modify the rotation of said other ring, thereby to secure a different abrading action on the articles driven by said other ring.

6. Apparatus for forming true surfaces, as described in claim 5, said motion transmitting means comprising wheels of different diameter rotatable with the rings, and a band connecting the wheels and transmitting rotary motion from one wheel to another.

7. Apparatus for forming true surfaces, as described in claim 5, wherein the lap is annular and the rings have an outside diameter substantially equal to the radial dimention of the surface of the lap and being adapted to wear the lap surface evenly while the surfaces of the articles are being formed by the said lap surface.

8. Apparatus for forming true surfaces of predetermined contour upon articles, said apparatus comprising an annular lap, a plurality of discs having apertures uniformly arranged near the periphery thereof, said discs being adapted to rest upon the lap and said articles being received in the apertures so as to rest likewise upon the lap, a ring around each disc and supported on said lap, the pressure of a ring on the lap being greater than the combined pressure on said lap of the articles; a rotatable mounting for each ring, a drive wheel for each ring, a band connecting the drive wheels, and means for rotating the lap, said rotating lap inducing rotation in the rings, article-holders and articles, whereby simultaneously to produce the desired contour upon the articles and true the lap.

9. An apparatus for forming a true surface of predetermined contour upon an article, said apparatus comprising a lap having a surface capable of producing the desired true surface, means for holding the article on the lap, means for rotating the lap relative to the article, and means for maintaining the surface of the lap in condition to produce the desired true surface, said last named means comprising a ring contacting the surface of the lap and adapted to wear the said surface, said ring loosely encircling the article holding means, a pivoted support for the ring whereby the ring is free to rotate relative to the lap surface under the influence of frictional forces developed between the ring and lap surface, and whereby said rotation is transmitted to the work holder by frictional contact between the ring and holder encircled thereby, and means for radially shifting the position of the ring relative to the lap surface for grinding the lap to either concave or convex form.

10. An apparatus for forming a true surface of predetermined contour upon an article, said apparatus comprising a lap having a surface capable of producing the desired true surface, means for holding the article on the lap, means for rotating the lap relative to the article, and means for maintaining the surface of the lap in condition to produce the desired true surface, said last named means comprising a ring contacting the surface of the lap and adapted to wear the said surface, said ring loosely encircling the article holding means, a pivoted support for the ring whereby the ring is free to rotate relative to the lap surface under the influence of frictional forces developed between the ring and lap surface, and whereby said rotation is transmitted to the work holder by frictional contact between the ring and holder encircled thereby, means for radially shifting the position of the ring relative to the lap surface for grinding the lap to either concave or convex form and means for continuously applying an abrasive mixed in a liquid carrier over the entire surface of the lap.

*11. The method of preserving the flatness of a plane surface of an annular lap having inside and outside peripheral edges rotating about a fixed axis, by means of a rigid dressing tool having an annular bottom wear face, which consists in positioning the annular dressing tool to rest upon the lap surface with the outside edge of the tool extending beyond the peripheral edges of the lap surface to provide an overhang at both the inside and outside peripheral edges, constraining the dressing tool, while resting on the lap surface with its axis substantially parallel to the axis of rotation of the lap surface but free to move its axis thru an angle so that the wear face may tend to conform with the lap surface when the latter is worn slightly out of flatness, to prevent movement of the tool bodily with the lap surface while permitting rotation of the tool by reason of its contact with the lap surface, shifting the dressing tool to vary the relative amount of overhang on the two peripheral edges and consequently alter slightly the balance of the tool, until the lap surface coincides with the desired flat surface, whereby when the dressing tool overhangs the outside peripheral edge of the lap surface a greater amount than it overhangs the inside edge, the tool will tend to wear the lap surface progressively more from the inside edge to the outside edge and when the tool is moved to overhang the inside edge of the lap surface a greater amount than it overhangs the outside edge, the tool will tend to wear the lap surface progressively more from the outside edge to the inside edge, whereby appropriate shifting of the tool toward or away from the axis of the lap surface will maintain the flatness of the lap surface.*

*12. The method of changing the contour of the surface of an annular lap to cause it to conform to a standard surface by means of a dressing tool, which consists in rotating the lap, positioning the tool to rest upon the lap surface while overhanging a peripheral edge of the lap surface, restraining the tool against movement bodily with the lap surface while permitting rotation of the tool with slight universal movement relative to the lap, and shifting the tool so as to vary the amount of overhang, the tool being shifted inwardly toward the axis of the lap when the contour is more convex than the standard and outwardly away from the axis of the lap when the contour is more concave than the standard, until the lap surface coincides with the desired standard surface.*

*13. Apparatus for forming a plane face on articles, said apparatus comprising a lap mounted for rotation about a vertical axis and having an upper annular lap surface capable of producing by abrasion the desired plane face, an annular work-encircling, dressing ring overhanging at least one of the two peripheral edges of the annular lap surface, open at its upper end to permit the insertion of the articles therein and at its lower end to permit the inserted articles to contact said annular lap, the bottom of the ring resting frictionally upon said annular lap surface and capable of abrading the same while the lap surface is abrading the articles within the ring, means for rotating the lap about its axis, means for constraining the ring to rotate about its own axis with slight universal movement as rotation of the ring is induced by frictional contact with the rotating lap surface, and means whereby said constraining means may be adjusted so that the axis of the dressing ring may be positioned with respect to the axis of the lap constantly to maintain the lap surface in condition to produce the desired plane face on the articles while the ring and articles within the ring are resting frictionally on the rotating lap surface, so that the ring and the work encircled thereby may be shifted inwardly toward the axis of the lap when the lap surface tends to become convex and outwardly away from the axis of the lap when the lap surface tends to become concave, without removing the articles being lapped and consequently avoiding the usual cessation of work while the lap surface is being dressed.*

*14. Apparatus for forming a plane surface on articles as set forth in claim 13 wherein the last mentioned means includes cooperating threaded elements capable of exerting a clamping effect on the constraining means.*

References Cited in the file of this patent or the original patent

UNITED STATES PATENTS

| | | |
|---|---|---|
| 282,761 | Obenchain | Aug. 7, 1883 |
| 765,105 | Setter | July 12, 1904 |
| 1,262,529 | Lowe | Apr. 9, 1918 |
| 1,406,407 | Miller | Feb. 14, 1922 |
| 1,486,345 | Hoke | Mar. 11, 1924 |
| 1,515,743 | Markland | Nov. 18, 1924 |
| 1,634,745 | Fraser | July 5, 1927 |
| 1,805,955 | Player et al. | May 19, 1931 |
| 2,079,076 | Kranich | May 4, 1937 |
| 2,209,071 | Bullard | July 23, 1940 |
| 2,274,332 | Jarrett | Feb. 24, 1942 |
| 2,308,512 | Hoffman | Jan. 19, 1943 |
| 2,326,034 | Jackson | Aug. 3, 1943 |
| 2,352,146 | Desenberg | June 20, 1944 |
| 2,407,206 | Luboshez | Sept. 3, 1946 |
| 2,419,033 | Primus | Apr. 15, 1947 |
| 2,423,118 | Ramsay | July 1, 1947 |
| 2,480,285 | Bullard | Aug. 30, 1949 |
| 2,539,561 | Wolfskill | Jan. 30, 1951 |

FOREIGN PATENTS

| | | |
|---|---|---|
| 345,443 | Germany | Dec. 10, 1921 |